UNITED STATES PATENT OFFICE.

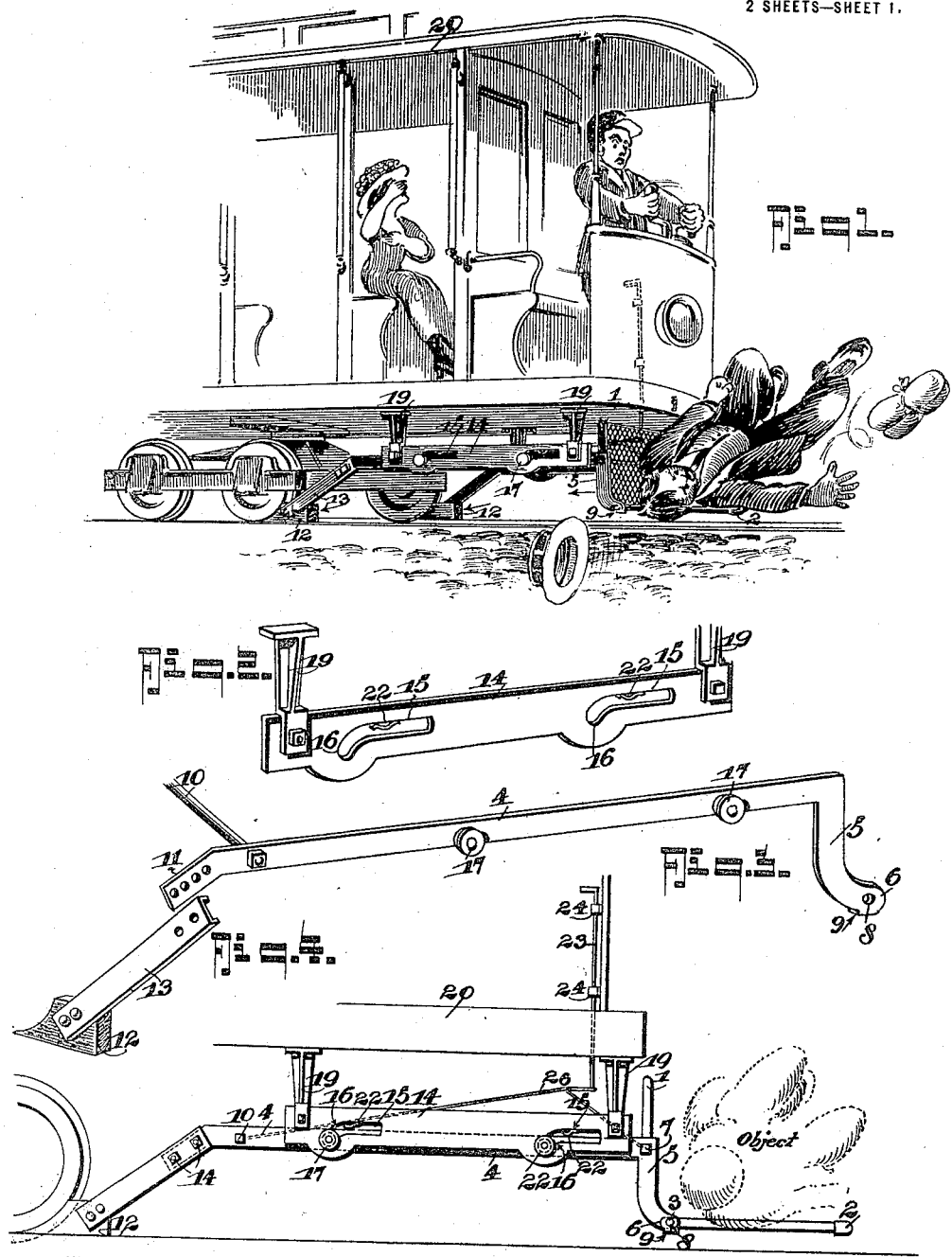

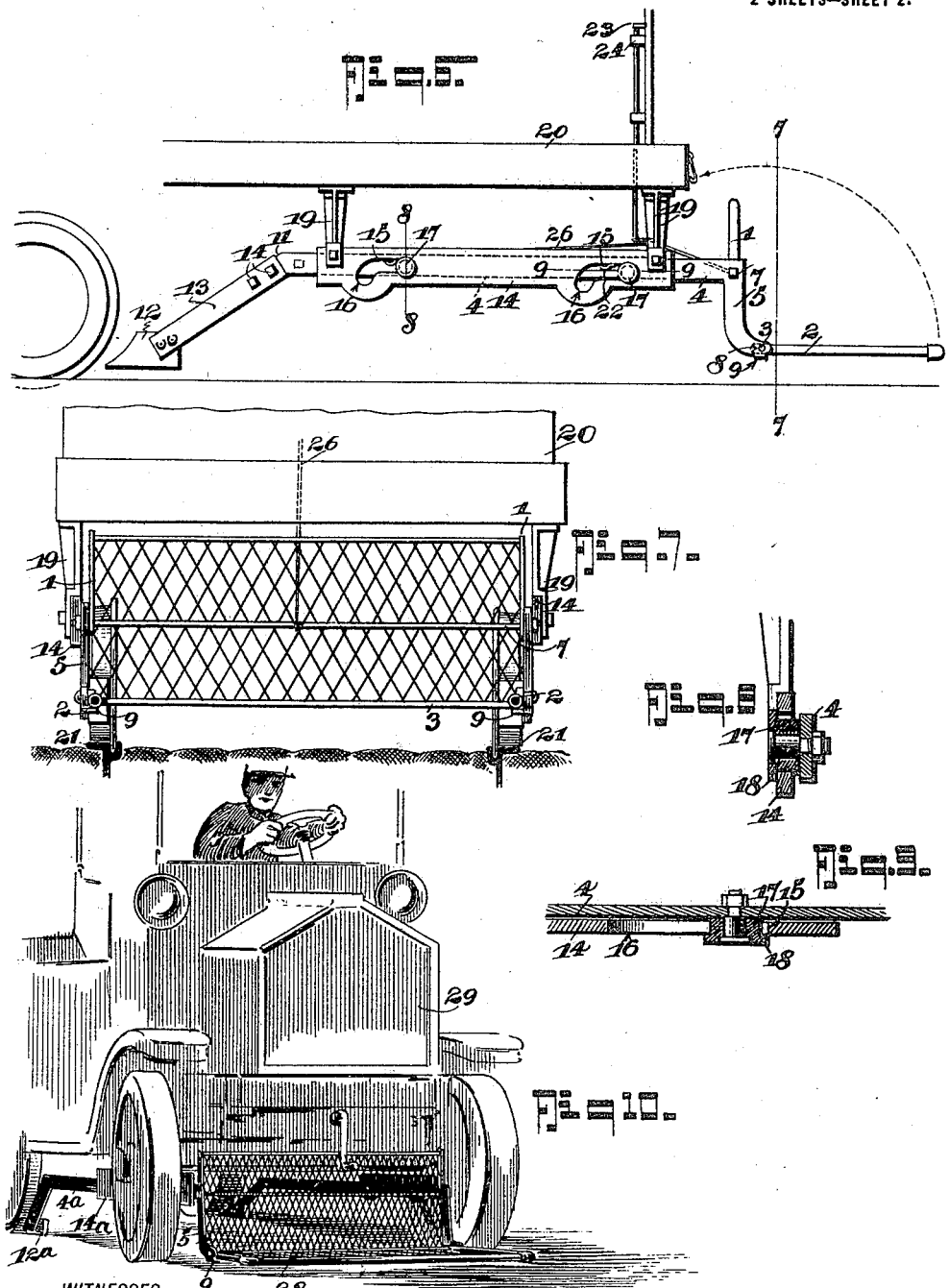

RODERICK MALLIATT PRICE, OF NEW ORLEANS, LOUISIANA.

FENDER.

1,209,494.  Specification of Letters Patent.  Patented Dec. 19, 1916.

Application filed June 24, 1916. Serial No. 105,551.

*To all whom it may concern:*

Be it known that I, RODERICK M. PRICE, a citizen of the United States, and a resident of New Orleans, in the parish of Orleans and State of Louisiana, have invented an Improvement in Fenders, of which the following is a specification.

My invention is an improvement in fenders for motor vehicles, and has for its object to provide a fender, having supporting means normally holding the fender in elevated position and out of contact with the track or street, and so arranged that when the fender meets resistance, as for instance in striking a body, the fender will be depressed into contact with the rails, or street, and at the same time the wheels will be braked, the fender having means in connection therewith and operated by the movement of the fender for controlling the braking mechanism.

In the drawings, Figure 1 is a perspective view of the fender in use. Fig. 2 is a perspective view of one of the guides. Fig. 3 is a similar view of one of the fender carriage bars. Fig. 4 is a perspective view of one of the brake shoes and the supporting mechanism therefor. Fig. 5 is a side view showing the fender in lowered position. Fig. 6 is a similar view showing the fender elevated. Figs. 7, 8 and 9 are sections on the lines 7—7, 8—8 and 9—9, respectively, of Fig. 6. Fig. 10 is a perspective view showing the fender applied to a motor truck.

In the present embodiment of the invention, the fender which is of usual construction, consisting of a rigid frame having a filling in the form of a yielding netting, is composed of a vertical portion 1, and a horizontal portion 2, which is hinged to the vertical portion at 3, to swing downward into operative position, or to swing upward into inoperative position, approximately parallel with the portion 1.

A carriage is provided for the fender, said carriage consisting of a pair of parallel laterally spaced supporting bars 4, each of which is provided at its forward end with a depending arm 5, the lower end of each arm being curved forwardly as indicated at 6. The portions 5 of the supporting bars 4 are arranged at opposite ends of the vertical portion 1 of the fender, and the forward ends of the bars 4 are secured to the said vertical portion intermediate the ends thereof, by means of a cross rod 7 which connects the fender portion with the bars, and connects the bars together.

The portion 2 of the fender is hinged between the curved portions 6 of the bars as indicated at 8, and the curved portion of each bar is provided with an inwardly extending shoulder or lug 9 just below the pivotal connection, for engaging the fender portion 2 to hold the same in horizontal position. Near their rear ends the bars 4 are connected by a second cross rod 10, and the bars and the rods constitute a carriage, which is mounted to slide longitudinally of the vehicle.

Each bar 4 is provided at its rear end with an oblique portion 11, each of the said portions being provided with a series of openings extending longitudinally of the said portion. A brake shoe 12 is connected with each bar at the rear thereof, each brake shoe being secured to one end of a channel bar 13, whose other end receives the oblique portion 11 of the adjacent bar, and the channel bar is provided at said end with openings for receiving bolts to connect the channel bar to the oblique portion. Because of the series of openings in the oblique portion 11, a degree of adjustment is permitted, to raise or lower the shoe 12.

Guides 14 in the form of plates are arranged at opposite sides of the vehicle, each guide being provided with a pair of alined longitudinally extending slots or passages 15, the said passages being near the ends of the plate, and each passage is provided at its rear end with a downwardly curving portion 16, for a purpose to be described.

Each bar 4 of the carriage is provided with a roller 17 for engaging each passage, and the rollers have the ends remote from the bars 4 flanged as indicated at 18 in Figs. 8 and 9, to prevent disengagement of the rollers. These rollers 17 engage the passages 15, and when the rollers are in the portions 15 of the passages, the fender will be at a higher level than when the rollers are in the portion 16 of the passage.

The guides 14 are connected with the vehicle by means of hangers 19, the said hangers being connected to the ends of the guide, and to the vehicle 20, in the present instance a street car, as shown. The shoes 12 are so arranged with respect to the bars 4, that when the rollers 18 are in the portions 15 of the passages, the shoes will be above the track or street level and in front of the wheels of the vehicle, while when the rollers 17 are in the portion 16 of the passages, the brake shoes will contact with the rails 21, or with the street level at the wheels, and will chock and brake the wheels.

Normally the parts occupy the position of Fig. 6, with the rollers 17 at the forward end of the passages 15—16, with the fender elevated, and with the brake shoes 12 out of contact with both wheels and rails. Should, for instance, the fender strike a man, the fender and carriage will be pushed rearwardly, and the rollers 17 will enter the depending portions 16 of slots or passages 15—16, thus permitting the fender, the carriage, and the brake shoes to move downward, in the position in Fig. 4, where the fender 2 is near the ground level, and the brake shoes are jammed into braking position with respect to the wheels and rails.

Springs 22 are arranged in the slots or passages, for normally retaining the rollers 17 at the forward ends of said passages, to prevent accidental rearward movement of the carriage when the car is in motion, and these springs are arranged to yield whenever the fender meets with obstruction. Mechanism is also provided for permitting the motorman to move the carriage rearwardly. The said mechanism comprises a shaft 23, which is journaled in bearings 24 in vertical position on the dashboard or front of the vehicle. This shaft is provided with a lateral arm at its lower end, and the front is connected by flexible members 26 with the cross rods 7 and 10, respectively, the arrangement being such that when the shaft 23 is turned, the fender carriage may be moved forwardly or rearwardly. Thus the improved fender may be operated automatically by the impact with an obstruction, or manually by the motorman, and it may be restored to normal position by the motorman.

In Fig. 10 is shown the fender indicated generally at 28 connected with a motor truck 29, the fender being supported by the carriage 4ª which is mounted to slide in the guides 14ª, corresponding with the guides 14 of Figs. 1 to 9. The carriage is provided with the brake shoes 12ª, which are adapted to be pushed between the rear wheels of the vehicle and the roadway, as indicated in Fig. 10, when the fender and carriage are moved rearwardly so that the rollers 17 will engage the depending portions of the slots or passages of the guides. It will be noticed from an inspection of Fig. 4, that the rear or engaging ends of the brake shoes are shaped to fit between the wheels and the street.

I claim:

1. In combination with a motor vehicle, a fender, a carriage to which the fender is connected and comprising a pair of parallel spaced connected supporting bars, guides on the vehicle on which the bars of the carriage are slidable, said bars having outwardly extending rollers, and the guides having longitudinally extending passages for receiving the rollers, each passage having a depending portion at its rear end for permitting the rollers to move downwardly when they engage therewith, each bar having at the rear end thereof an oblique portion supporting a brake shoe, adapted to engage between the wheel and the track when the fender is in lowered position, resilient mechanism for normally retaining the carriage in forward position, and manually operated means for moving the carriage rearwardly.

2. In combination with a motor vehicle, a fender, a carriage to which the fender is connected and comprising a pair of parallel spaced connected supporting bars, guides on the vehicle on which the bars of the carriage are slidable, said bars having outwardly extending rollers, and the guides having longitudinally extending passages for receiving the rollers, each passage having a depending portion at its rear end for permitting the rollers to move downwardly when they engage therewith, each bar having at the rear end thereof an oblique portion supporting a brake shoe, adapted to engage between the wheel and the track when the fender is in lowered position.

3. In combination with a motor vehicle, a fender, a carriage for supporting the fender, said carriage having brake shoes at its rear end, guides on the vehicle, the carriage being movable on the guides, and the guides having means for constraining the carriage to move horizontally and then vertically to lower the fender and to engage the brake shoes with the wheels, the carriage being moved by the impact of an obstruction, and manually operated means under control of the motorman or chauffeur for moving the carriage rearwardly.

4. In combination with a motor vehicle, a fender, a carriage for supporting the fender, said carriage having brake shoes at its rear end, guides on the vehicle, the carriage being movable on the guides, and the guides having means for constraining the carriage to move horizontally and then vertically to lower the fender and to engage the brake shoes with the wheels, the carriage being moved by the impact of an obstruction.

5. In combination with a motor vehicle, a fender, a carriage for supporting the fender, guides on the vehicle, the carriage being movable on the guides, and the guides having means for constraining the carriage to move horizontally and then vertically to lower the fender, the carriage being moved by the impact of an obstruction against the fender, and resilient means for normally holding the carriage in elevated position.

RODERICK MALLIATT PRICE.

Copies of this patent may be obtained for five cents each, by addressing the "Commissioner of Patents, Washington, D. C."